United States Patent
Eshghi et al.

(10) Patent No.: US 7,895,666 B1
(45) Date of Patent: Feb. 22, 2011

(54) DATA STRUCTURE REPRESENTATION USING HASH-BASED DIRECTED ACYCLIC GRAPHS AND RELATED METHOD

(75) Inventors: Kave Eshghi, Palo Alto, CA (US); Evan Randy Kirshenbaum, Palo Alto, CA (US); Mark David Lillibridge, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1084 days.

(21) Appl. No.: 11/514,634

(22) Filed: Sep. 1, 2006

(51) Int. Cl.
G06F 7/04 (2006.01)
G06F 17/30 (2006.01)
G06F 7/00 (2006.01)
G06Q 20/00 (2006.01)
H04L 9/32 (2006.01)
H04L 9/08 (2006.01)
G06F 12/14 (2006.01)

(52) U.S. Cl. .............. 726/30; 705/25; 705/80; 707/747; 707/791; 707/798

(58) Field of Classification Search ............ 726/30; 707/201, 203, 999.203
See application file for complete search history.

(56) References Cited

U.S. PATENT DOCUMENTS 7,584,223 B1 * 9/2009 Pinkas et al. .......... 707/999.203
2006/0282475 A1 * 12/2006 Suermondt et al. .......... 707/201

FOREIGN PATENT DOCUMENTS

GB 2401006 A * 10/2004

OTHER PUBLICATIONS

Feifei Li, Marios Hadjieleftheriou, George Kollios, Leonid Reyzin, "Dynamic authenticated index structures for outsourced databases", Jun. 2006, SIGMOD '06: Proceedings of the 2006 ACM SIGMOD international conference on Management of data, Publisher: ACM, pp. 121-132.*
R. Anderson and E. Biham, "Two Practical and Provably Secure Block Ciphers: Bear and Lion", 3rd International Workshop on Fast Software Encryption, 1996, pp. 113-120.
J. Douceur et al., "Reclaiming Space from Duplicate Files in a Serverless Distributed File System", ICDCS, Jul. 2002 (http://citeseer.ist.psu.edu/douceur02reclaming.html).

* cited by examiner

*Primary Examiner*—Matthew B Smithers
*Assistant Examiner*—Courtney D Fields

(57) ABSTRACT

A method for creating an embedding node. The method includes creating a first hash-based directed acyclic graph ("HDAG") having a first node, which includes data, and creating a second HDAG having a second node that includes one or more data fields that store the first node.

20 Claims, 13 Drawing Sheets

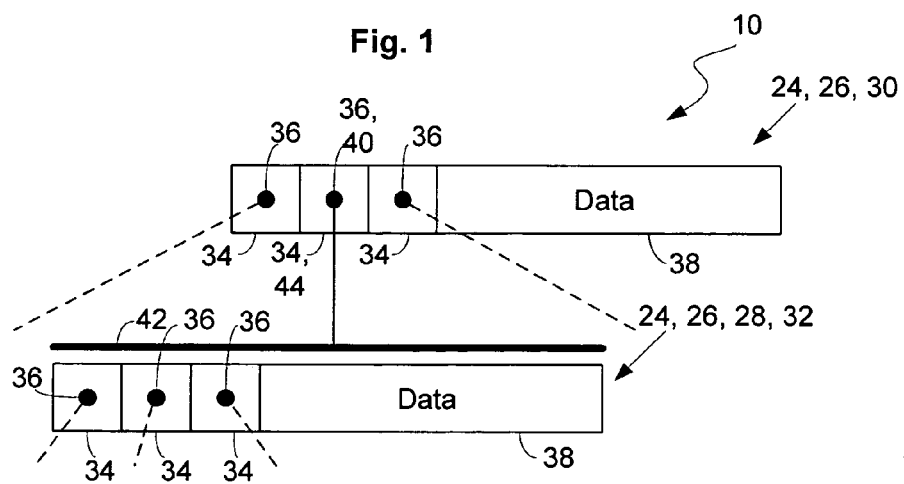
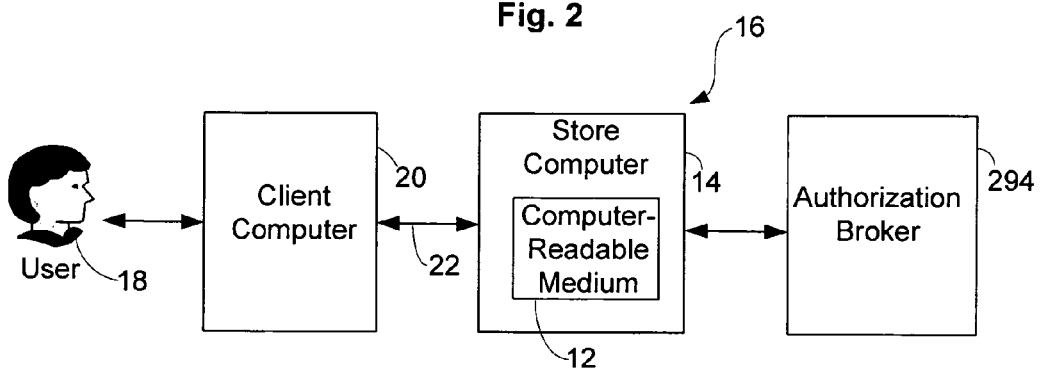
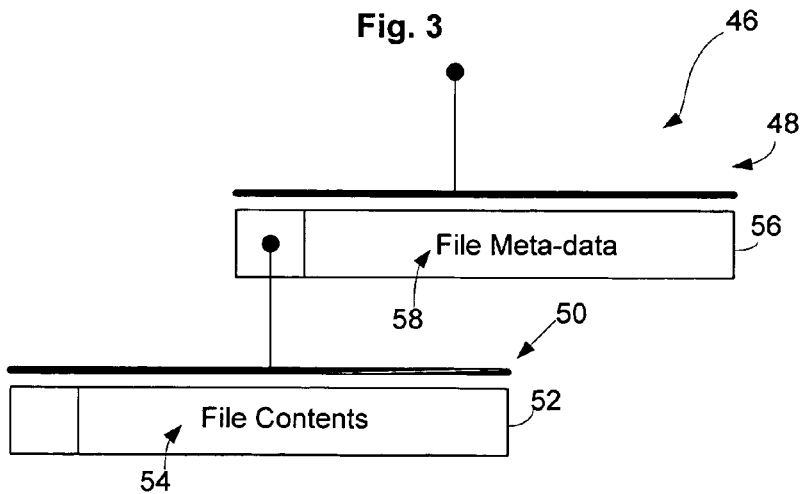

DATA STRUCTURE REPRESENTATION USING HASH-BASED DIRECTED ACYCLIC GRAPHS AND RELATED METHOD

BACKGROUND

Hash-based directed acyclic graphs ("HDAGs") can be used to represent a structured document collection, e.g., a directory structure, of computer data. In particular, HDAGs can be used in representing a structured document collection that is used in archival data storage applications and synchronization applications in a computer apparatus. A property of HDAGs that makes their use in representing a structured document collection, and, in particular, in on-line data storage applications, archival storage applications, and synchronization applications associated with structured document collections, advantageous is the automatic structure-sharing property. The automatic structure-sharing property is the characteristic of HDAGs that identical portions, e.g., subdirectories that contain identical content but are from different filesystems or common portions of different files, where each filesystem or file is represented by a separate HDAG, are not duplicated within each of the HDAGs.

The automatic structure-sharing property that is associated with HDAGs can be illustrated using the following example. First, consider two filesystems, with each of the two filesystems located on separate computers, and each of the two filesystems including an identical subdirectory. The HDAG structures for each of the two filesystems can be built independent of one another and without any communication between the two computers. As long as the same algorithm is used to map each of the two filesystems to an HDAG, the resulting HDAGs (one HDAG for each filesystem), will have an identical and shared substructure that corresponds to the shared subdirectory. This automatic structure-sharing property is advantageous when HDAGs are used in storage and synchronization applications.

Another property of HDAGs that makes their use in representing a structured document collection, and in particular, in archival storage and synchronization applications, advantageous is the self-assembly property. The self-assembly property is the characteristic of HDAGs that given a set of unordered nodes from an HDAG, the parent-child relationships that exist between the nodes can be determined without any additional information.

While HDAGs can be used in archival storage and synchronization applications, the use of HDAGs in these instances can result in data security issues. In particular, HDAGs, when left unencrypted, are potentially vulnerable to snooping when the storage media where the HDAGs are stored, or the communication media through which transfers of the HDAGs are made, are insecure. Hence, there is a need for a system and method that overcomes one or more of the drawbacks that are identified above.

BRIEF DESCRIPTION OF THE DRAWINGS

FIG. 1 is an example HDAG; shown is one parent node and one node that is a child and a parent, with both of the nodes including hash pointers.

FIG. 2 is a block diagram of an example computer apparatus according to one embodiment of the invention.

FIG. 3 is an example HDAG that includes one parent node, which includes a hash pointer that points to one child node that does not include a hash pointer.

DETAILED DESCRIPTION

Figure 4:
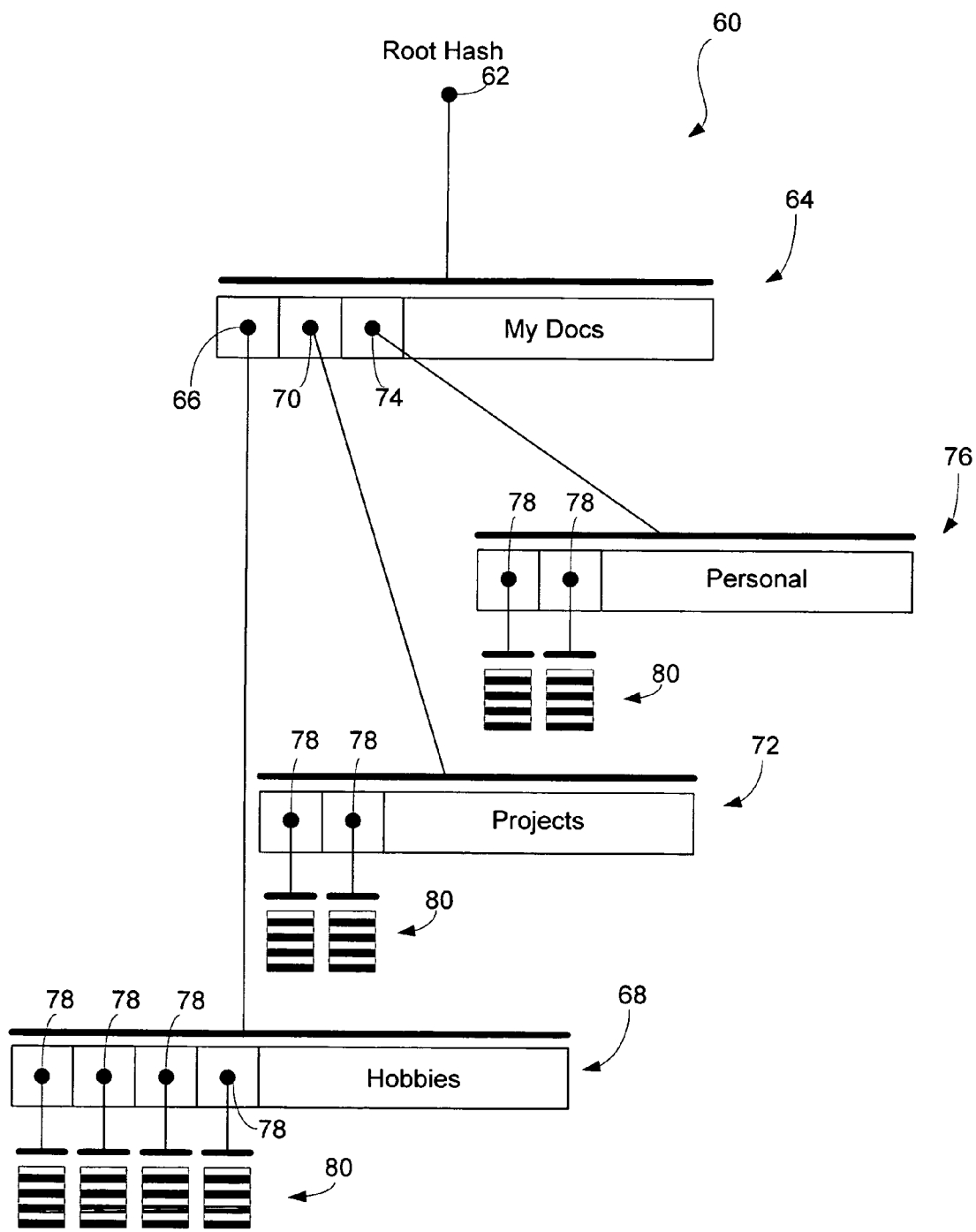
FIG. 4 is an example HDAG that represents a directory structure.

Referring to FIGS. 1 and 2, a hash-based directed acyclic graph ("HDAG") 10 graphically represents a data structure for hierarchical data, such as a snapshot of the data contained in a directory structure within a computer filesystem. The data structure and its associated data can be stored in a computer-readable medium 12, e.g., a RAM, ROM, EEPROM, flash memory, CDROM, DVD, optical disk, magnetic cassette, magnetic tape, magnetic disk drive, or any other medium that can be used to store information and that can be accessed by a computer 14 (the "store computer"), e.g., a server. The store computer is included as part of a computer apparatus 16, which is accessible by a user 18 via a client computer 20, which may access the store computer via a network 22. The client computer and the store computer can be the same physical device.

An HDAG 10 includes nodes 24 and each of the HDAG nodes can represent an item, for example, a directory, a subdirectory, a file, a communication, a document, a record, a collection, or a portion thereof. HDAGs are directed graphs: their edges, i.e., connections between nodes, are directed, having a distinguished source and a distinguished destination. An HDAG is acyclic because no non-empty path through an HDAG can start and end at the same node. In a directed acyclic graph ("DAG"), the source of an edge is referred to as the parent of the destination of that edge.

HDAGs 10 can include parent nodes 26 and child nodes 28 (in FIG. 1, the first node 30 is a parent node and not a child node, while the second node 32 is both a parent node and a child node), where each parent node is coupled directly to one or more child nodes. Note that a given node can be both a parent and a child node. Conventionally, when depicted, each parent node is positioned above its child node(s) in a graph. The structure of a directed acyclic graph, e.g., an HDAG, is more flexible than a directed acyclic graph having a tree structure, because each child node in a directed acyclic graph can have multiple parent nodes. Thus, for a directed acyclic graph, different paths may be followed through the graph to reach the same node.

Each HDAG node 24 is a serialization, i.e., a conversion of a data object into a stream of data, of a portion of a data structure. Each HDAG node includes a (possibly empty) array of pointer fields 34, each of which contains a hash pointer 36 and usually one or more data fields 38. A hash pointer is the hash of the node it points to, and is pictorially represented in an HDAG as a black dot 40 connected to a solid bar 42, which is placed over the node that is pointed to, indicating that it has been hashed. For example, in FIG. 1, the second pointer field 44 of the top parent node 30 holds a hash pointer that is the hash of the sole child node 32 illustrated in the figure. In alternative embodiments, a hash pointer may hold the hash of a nonempty proper subset of the fields of the node to which it points. In some embodiments, special hash pointers called null hash pointers are used which do not point to any node.

A cryptographic hash 36, also referred to as a hash value, is a number that is generated by applying a cryptographic hash algorithm, also referred to as a hash function, e.g., MD4, MD5, and SHA-1, to a block of data, e.g., a text message. Unless otherwise specified, all hashes in this document refer to cryptographic hashes. The hash function converts the block of data into a string of digits. The hash tends to be smaller than the original block of data, though it will be large enough that the number of possible hashes dwarfs the number of actual data objects expected to be hashed. The hash is generated such that all possible values are roughly equally likely to occur, and given a block of data and its hash, it is computationally infeasible to find another block of data with the same hash. Thus, each hash is effectively unique based on its corresponding block of data.

Another example HDAG 46 is illustrated in FIG. 3, which includes a parent node 48 and a child node 50. This HDAG encodes the contents and metadata of a file. The child node in FIG. 3 is also referred to as a "leaf node" because it is a node that is not a parent to another node. In FIG. 3, the leaf node's data field 52 contains the data contents 54 of the file, and the parent node's data field 56 contains the metadata 58 that is associated with the file. Examples of metadata that can be associated with the file are the following: the name of the file, the owner of the file, the creator of the file, the access control list for the file, the creation time of the file, the last access time for the file, the last modification time for the file, the size of the file, the expiration date of the file, a retention class that is associated with the file, a project that is associated with the file, and keywords that are associated with the file.

The encoding illustrated in FIG. 3 can be extended to apply to a scenario where two files contain the same data 54 but have different metadata 58, e.g., different file names. In this example scenario, two different parent nodes share (point to) a single leaf node 50. As a result of the previously discussed automatic structure-sharing property of HDAGs, an HDAG that theoretically could include the file data in two different places within the graph will end up with only one copy of a node containing the file data. This one node will be pointed to by two different parent nodes.

The Unique Root Hash:

An HDAG 10 is considered to be "rooted" if there is one node 30 that is an ancestor of all of the other nodes 24 in that HDAG. An HDAG is considered to be "complete" if the HDAG includes no "dangling" pointers 36, i.e., all of the child nodes 28 pointed to by nodes in the HDAG are included in the HDAG. The directory structure that is illustrated in the HDAG 60 of FIG. 4 is an example of a complete and rooted HDAG. The complete, rooted HDAG of FIG. 4 includes the following: a root hash 62 of a first, or root, node 64—the "My Docs" node; a second hash 66 of the "Hobbies" node 68; a third hash 70 of the "Projects" node 72; and a fourth hash 74 of the "Personal" node 76. Also included in FIG. 4 are various hashes 78 for additional nodes 80 (leaf nodes) that are shown in abbreviated form.

A root hash 62 is the hash of just the root node 64 for an HDAG 60. For a complete, rooted HDAG, it is extremely difficult to find a different complete, rooted HDAG, even an HDAG that is different only in its leaf nodes 80, with that same root hash. Thus, each root hash is effectively unique to its complete, rooted HDAG. This property makes HDAGs ideal structures to use for representing different versions of a data structure, since every version of the data structure can be uniquely identified using its root hash.

The Automatic Structure-Sharing Property:

Referring again to FIG. 1, as previously discussed, the automatic structure-sharing property is a characteristic of HDAGs 10 where identical portions of different filesystems, or within a single filesystem, are represented by identical HDAGs, which can be shared by two or more HDAGs that contain them. Also, the automatic structure-sharing property will automatically share structure between HDAGs that represent different versions, for example, those constructed on different days, of a single filesystem.

The following is an example of how the automatic structure-sharing property is useful in a single filesystem. Initially, a first HDAG 10 is generated based on a snapshot of a filesystem. Next, one of the files that is included in the filesystem is modified. Finally, a second HDAG is generated based on a snapshot of the filesystem that includes the modified file. The difference between the first and second HDAGs is the node 24 that represents the modified file. Since the hash 36 of the node that is associated with the modified file is incorporated into the node representing that file's directory, the hash of the node representing that directory is different from its initial value. Thus, the hash of every node that is an ancestor to the modified file going from the modified file to the root will be different from its initial value. But none of the other nodes in the HDAGs are changed, so the sub-HDAGs representing the unchanged directories are identical to their initial values.

Figure 5:
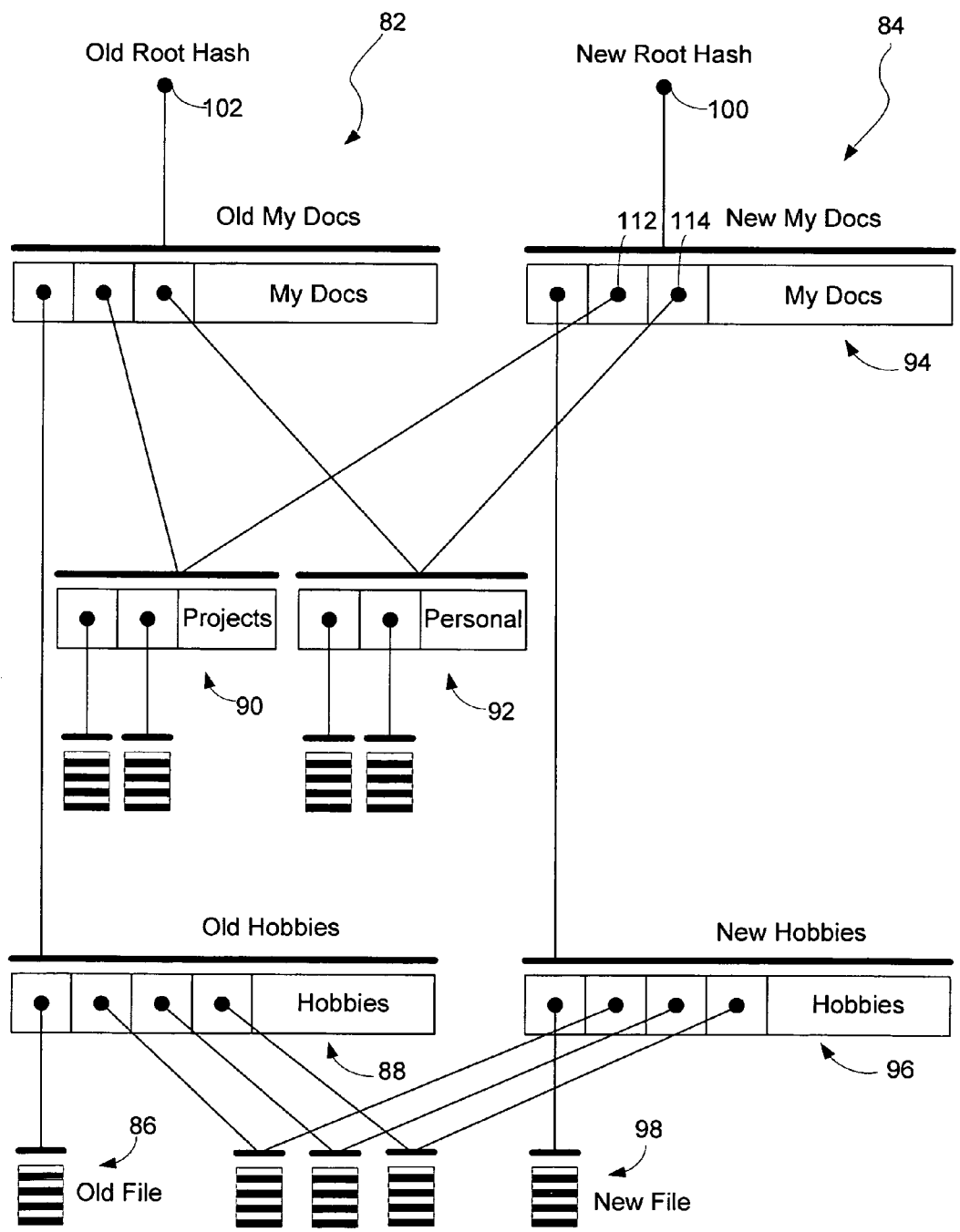
FIG. 5 includes two example HDAGs that illustrate structure sharing.

FIG. 5 illustrates an example situation where the content of one file is changed between a first HDAG 82, a first "snapshot," and a second HDAG 84, a second "snapshot." In FIG. 5, one file 86 has changed in the "hobbies" directory (see the hobbies node 88). Since the files included in the "projects" and "personal" directories (see the projects node 90 and the personal node 92, respectively) have not changed, the HDAG representation of these two directories remains the same and is shared by both the first and the second HDAGs. Thus, a complete HDAG 84 representing the second snapshot requires the construction of only two nodes 94 and 96 in addition to the node that represents the new file 98. The new root hash 100 denotes the entire new HDAG 84.

The Automatic Self-Assembly Property:

Referring again to FIG. 1, because all of the pointers 36 in an HDAG 10 are hashes, given a set of HDAG nodes 24, the parent-child relationships between the various nodes that are included in the HDAG can be re-created without any extra information. This characteristic of HDAGs is referred to as the self-assembly property. To re-create the parent-child relationships, first, the nodes are de-serialized so that the hash pointers can be accessed. Next, every node is hashed. Finally, each child node 28 is matched with its parent node(s) 26 based on the equality of the hash pointer in the parent node with the hash of the child node.

A consequence of the self-assembly property of HDAGs 10 is that the HDAG can be reassembled using HDAG fragments, which include various HDAG nodes 24, gathered in any order from multiple sources. No matter where the nodes come from, there is at most one way to reassemble them into a complete, rooted HDAG. The self-assembly property also results in HDAGs having a strong notion of completeness, i.e., when reassembling an HDAG it is easy to ascertain if all of the nodes are present in the reassembled HDAG. Also, since it is extremely hard to find a different node with the same hash, nodes that have been corrupted, for one reason or another, can be detected and rejected.

Using HDAGs for Storing Multiple Versions of a Directory Structure:

Referring additionally to FIG. 2, consider an application where a snapshot of a directory structure is to be stored, e.g., copied to memory 12 in a computer 14, every day. One simple solution is to create a tape archive ("tar") file for the given directory every day, and to store the tar file. Tar is a computer utility, similar to WINZIP by WinZip Computing of Mansfield, Conn., that combines multiple files or directories into a single file. While simple, creating daily tar files is very wasteful of storage space since most files will not change between snapshots. What is more ideal is a way to store the unchanged portions of a directory structure just once.

The use of HDAGs 10 provides a particularly simple and effective way of achieving the goal of storing the unchanged portions of a directory just once. In a nutshell, periodically, e.g., daily, the following steps are performed: (1) create an HDAG of the current directory structure, and (2) send the HDAG to an HDAG store 12, e.g., a memory, using, for example, a smart synchronization algorithm, which is described below.

Referring additionally to FIG. 5, the automatic structure-sharing properties of HDAGs 82 and 84 ensure that the portions 90 and 92 of the directory tree that have not changed between snapshots will be represented by identical sub-HDAGs in both snapshots. Since HDAG stores 12 are designed in such a way that they store each HDAG node 24 only once no matter how many copies of it are received, the shared sub-HDAGs are stored only once. Notice, however, that the two snapshots will have distinct root hashes 102 and 100, respectively, that are unique for each snapshot. Therefore, by traversing the HDAG for a snapshot starting from its root hash, that desired snapshot can be re-created at any time without any ambiguity.

Figure 6:
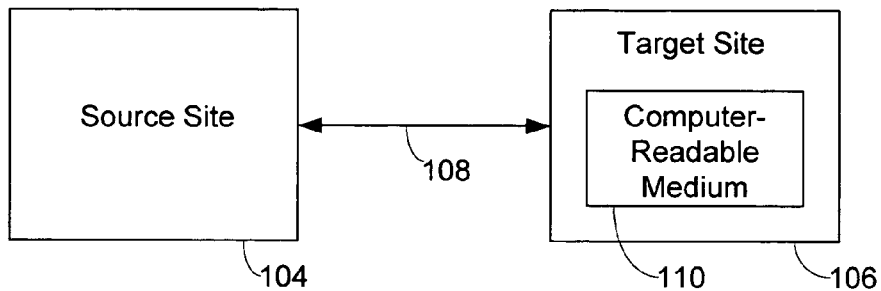
FIG. 6 is a block diagram of an example computer network that includes a source site and a target site.

Synchronization:

Synchronization is an issue that is related to maintaining an up-to-date version of an HDAG 10. Referring additionally to FIG. 6, HDAG synchronization can be described in the following example. First, assume that there is a site 104, the "source site," which can be a computer 14, e.g., a server, where an up-to-date version of a directory structure exists and/or is stored. Second, assume that there is another site 106, the "target site," which can be another computer where an older version of the same directory structure exists. The connection 108 between the two sites may be slow and unreliable. In this example, synchronization means creating a copy of the up-to-date version of the directory structure on the target site while minimizing the transfer time required for the copy process, and maximizing the reliability of the copy process.

In this example, the synchronization algorithm that is used during the copy process assumes that there is an HDAG store 110, i.e., a storage device, for example, a computer-readable medium, that is used for storing the HDAG 10, at the target site 106 that contains a snapshot of the earlier version of the directory structure. The challenge is then to store a snapshot of the up-to-date version of the directory structure at the HDAG store while taking advantage of the existing version of the directory structure at the target site. Once the snapshot of the up-to-date version of the directory is stored in the local HDAG store within the target site, it is easy to extract the snapshot of the up-to-date version of the directory from the local HDAG store to a normal, target-site filesystem for processing.

The synchronization algorithm relies on the following properties of the HDAGs 82 and 84: structure sharing, i.e., shared subdirectories (see shared nodes 90 and 92) in the source version of the directory and target version of the directory are represented by the same sub-HDAG; the uniqueness of HDAG root hashes 100 and 102; and the strong notion of HDAG completeness, i.e., given a root hash, it can be determined, without any ambiguity, whether or not the root hash is associated with a given complete, rooted HDAG. The synchronization algorithm can run on the source site's computer apparatus 104.

Assume that "H" is the complete, rooted HDAG 84 of the source directory structure. The synchronization algorithm traverses H, and for each node "N" 24 encountered, queries the remote HDAG store 110 in the target site 106 as to whether it has the complete HDAG whose root hash is the hash of N. If the answer is negative, N is sent to the store in the target site and, if N is not a leaf node, the process is repeated with each node that is a child of N. If the answer is positive, then N and its children need not be sent to the target site or even queried about.

Due to the properties of HDAGs 10 that are discussed above, there is a great deal of flexibility in the order in which the nodes 24 of H are traversed. In particular, it is not required that the whole of H 84 be in the memory of site 104 at the same time. Moreover, there can be multiple threads, i.e., concurrently executing programs, or portions of a program, that implement the synchronization algorithm, and that work on different parts of H in a simultaneous manner. At the end of the synchronization process, the root hash 100 of H is known, and the HDAG store 110 at the target site 106 includes a complete, rooted HDAG. The advantages of this synchronization algorithm include efficiency and fault tolerance, which are discussed below.

Efficiency:

Referring again to FIG. 5, before a node 94 of the source HDAG 84 is sent to the target site 106, the remote store 110, i.e., the store at the target site, is queried to see if it already includes that node and its descendents by sending the hash 100 of that node. If the remote store 110 replies that it does not have the HDAG with that root hash, the node 94 is sent to the target site 106. Now, the source site 104 queries about node 94's children 90, 92, and 96. Since unchanged sub-structures 90 and 92 will have the identical root hashes 112 and 114, respectively, the remote store responds that it has these nodes and their children, and that there is no need to send these nodes and their children to the remote store. As a result, just the parts of the HDAG that have been modified since the previous snapshot (the new file 98, the "New Hobbies" node 96, and the "New My Docs" node 94) are sent to the target site. To minimize the latency of the query response, queries can be sent by one thread and the responses processed asynchronously in another thread. These characteristics of the synchronization algorithm result in increased efficiency.

Reliability:

A high level of reliability is associated with the synchronization algorithm. For example, if something goes wrong during the synchronization process, e.g., if a number of nodes 24 are corrupted during the process, then this error will be detected by comparing the hashes 36, and the corrupted nodes will be re-sent. If the synchronization process is interrupted for some reason, e.g., just 70% of the complete transfer is sent to the target site 106 because the connection between the source site 104 and the HDAG store 110 at the target site fails, all that needs to be done is to start the synchronization process from the beginning. Since all of the HDAG nodes that already have been transferred are kept at the HDAG store, very quickly the synchronization process will reach the same point in the process where the previous transfer was interrupted, and continue from that point. The time that is lost is the time spent scanning the source directory and constructing the HDAG 84 again, which is a fraction of the transfer time. In some embodiments, some or all of the HDAG may be cached on the source site 104, in which case, the time that is lost is merely the time required to check that the cache is up-to-date and to reconstruct any new portions of the HDAG. In any event, it will be known when the transfer is complete, because a complete transfer occurs when a complete, rooted HDAG 84 is in the target site's HDAG store having a root hash 100 that is the same as the root hash of the source site's HDAG. This fact can be established by a simple comparison of the root hash in the target site to the root hash in the source site.

HDAG Security Issues:

A relevant idea is called "convergent encryption," and is described as follows: given a byte sequence, B, a hash of B is used as the encryption key for B using a deterministic encryption algorithm. When applied to the problem of encrypting an HDAG 10, this idea can be implemented as follows. For each HDAG node 24, first, the node is hashed, e.g., using MD4, MD5, or SHA-1. Next, the hash is used as the encryption key for a deterministic encryption algorithm, e.g., data encryption standard ("DES") in cipher-block chaining ("CBC") mode with a constant initialization vector, to generate the encryption of the node. Deterministic encryption algorithms always produce the same ciphertext for any given plaintext. Thus, the ciphertext message includes all of the plaintext message, but it is in a format that is not readable without a decryption mechanism (e.g., the proper key). This means that anybody that has the hash of an original HDAG node can use that hash as the key for decrypting that node. Moreover, since this operation is deterministically based just on the contents of the node, two independent agents encrypting the same node will encrypt it the same way, and thus, can share identical nodes.

There are two disadvantages to using convergent encryption for encrypting HDAG nodes 24. The first disadvantage is that the structure of the HDAG 10 is now unreadable for anyone who does not have the decryption keys for all of the HDAG nodes. Thus, an untrusted agent cannot use the previously mentioned properties of HDAGs for synchronization, integrity checking, self assembly, and completeness checking. The second disadvantage is that all of the encryption keys for all of the HDAG nodes need to be managed by some other mechanism. Given that the number of nodes in an HDAG can be very large, this creates a serious key management problem.

The present embodiments avoid these disadvantages by "encrypting" an entire HDAG 10 at once in a structure preserving way rather than encrypting each node 24 independently. Given a first HDAG to be encrypted, embodiments create a second parallel HDAG, i.e., another HDAG that has the same structure as the original HDAG, called an embedding HDAG. The data fields 38 of the second HDAG's nodes can contain encryptions of the corresponding original HDAG nodes.

Figure 7:
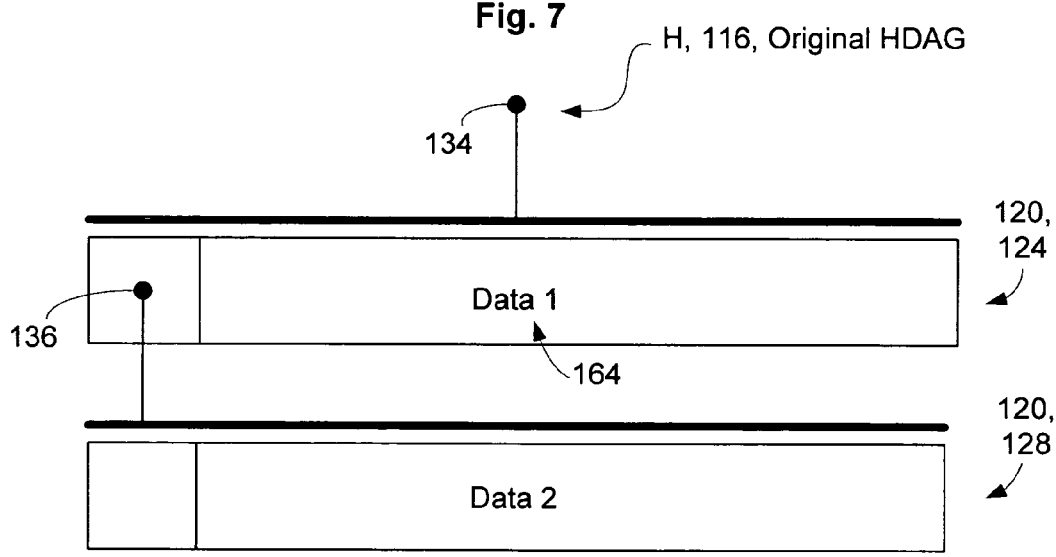
FIG. 7 is an example HDAG that includes one parent node, which includes a hash pointer that points to one child node.
Figure 8:
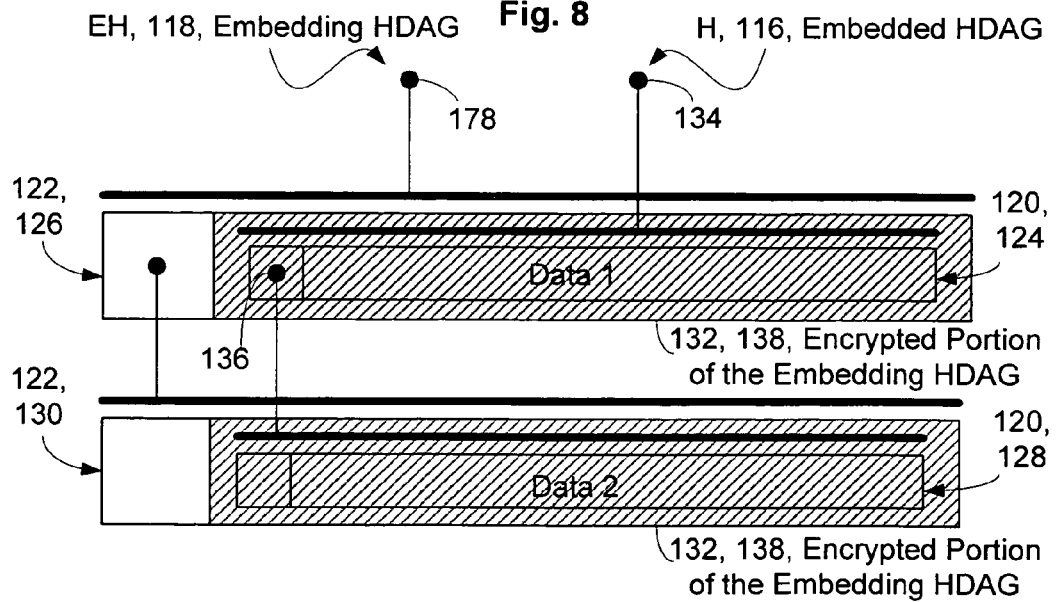
FIG. 8 is an example HDAG that embeds the two nodes of FIG. 7 according to one embodiment of the invention.

For example, referring to FIGS. 7 and 8, let "H" be the first HDAG 116 of a data structure that is to be protected. Thus, H is a means for representing the data structure. A second HDAG 118, "EH," is created where for every node ("n") 120 of H there is a corresponding node ("en") 122 of EH. In the shown figures, the "Data 1" node 124 of H has corresponding node 126 in EH, and the "Data 2" node 128 of H has corresponding node 130 in EH. Accordingly, EH is another means for representing the same data structure. A node of EH that corresponds to a node of H is referred to as "the embedding" of that node, and the node of H is referred to as "the embedded node." Thus, the nodes of EH are referred to as "embedding nodes" and EH is referred to as "an embedding HDAG" to distinguish them and it from the original nodes 120 and the original HDAG, H. Each embedding node en stores a version of its embedded node n in one or more of its data fields 132. Under one embodiment, the version of node n is broken into several pieces, each of which is stored in a different data field 132 of node en. The one or more data fields 132 may store other things as well in some embodiments. Node en is said to embed node n. When there is a need to be more specific about which version is being embedded, it is said that node en embeds a version V of node n rather than just node en embeds node n. Usually, the version V is an encrypted form of the embedded node. It should be understood that a node can include more than one data field and that more than one such data field may need to be accessed in order to reconstruct the node of H.

Furthermore, in this example, the data field 132 of EH node 126 contains a deterministic encryption (shown shaded to depict encryption) of the H "Data 1" node 124 using the hash 134 of that node 124 as the encryption key, and any children 130 of node 126 are the embeddings of the children 128 of node 124 in the same order. Similarly, the data field 132 of node 130 contains a deterministic encryption of node 128 using the hash 136 of that node 128 as the encryption key. Thus, FIG. 8 illustrates the embedding of encrypted versions of two nodes, node 124 and node 128. The shaded areas 138 of FIG. 8 are encrypted, with encryption key 134 used for the data field of the node 126 and encryption key 136 used for the data field of node 130.

Figure 9:
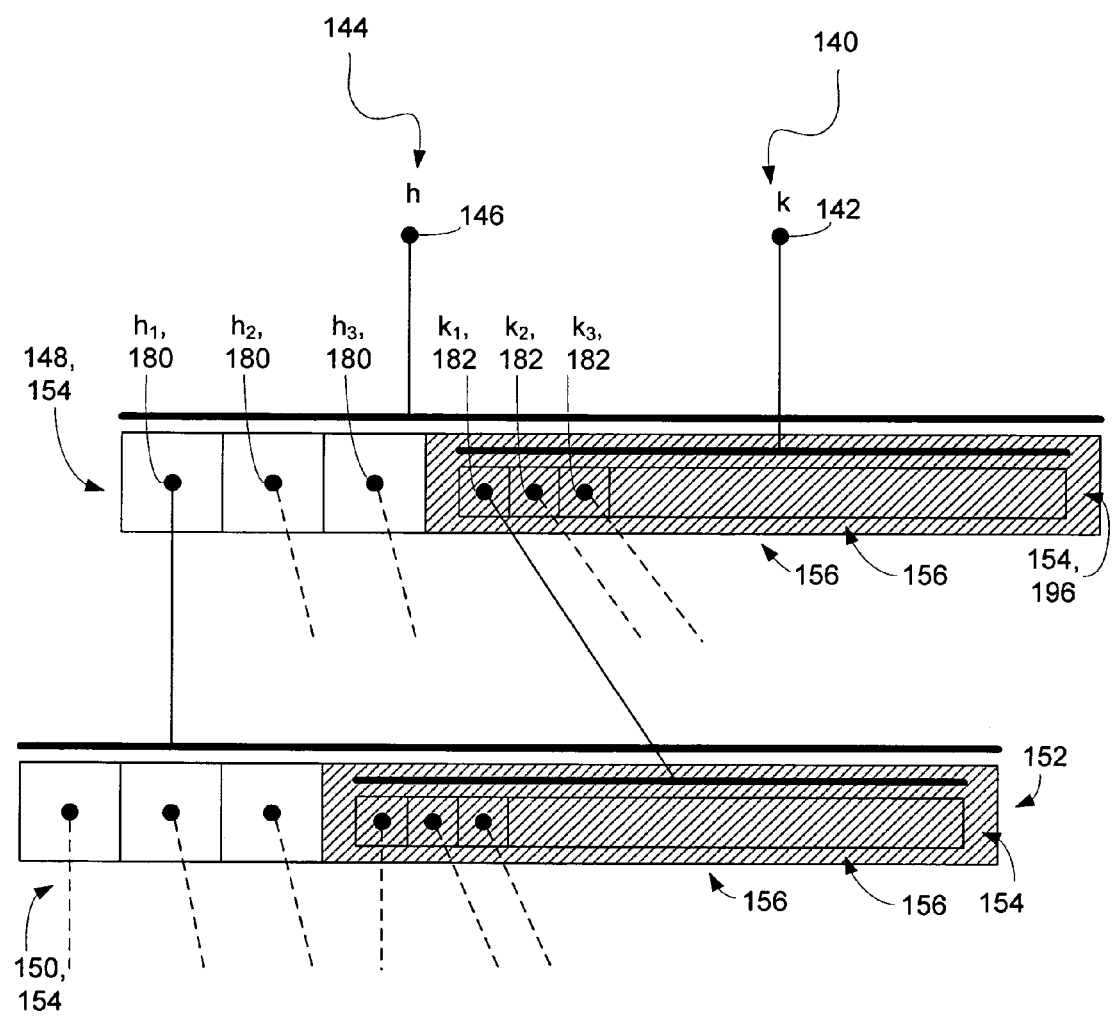
FIG. 9 is an example HDAG that illustrates the embedding of both a parent node and a child node within respective embedding parent and child nodes according to one embodiment of the invention.

Extending this idea, FIG. 9, illustrates the general case wherein a first HDAG 140 with root hash k 142 has been embedded in a second HDAG 144 with root hash h 146. Shown in FIG. 9 are a top level embedding node 148 and one embedding node 150 of a second level 152 of the embedding of one HDAG 140 in another HDAG 144. Both of the HDAGs shown in FIG. 9 include a plurality of nodes 154, where a plurality of nodes can include two or more nodes. The two HDAGs parallel each other: if the contents of the data fields 156 are ignored, the two HDAGs have the same structure; that is, they have the same number of nodes and corresponding nodes are related to each other in the same way. In this description, using a hash value as an encryption key should be understood as including using any well-known transformation of the hash value as an encryption key. Such transformations might include truncation to a specific length or addition of other information such as the length of the node being encrypted or an indication of an identity of the server 14 on which the data is to be stored. The addition of such information may reduce sharing when nodes are transferred between federated servers, but this may be desirable in some situations.

Figure 10:
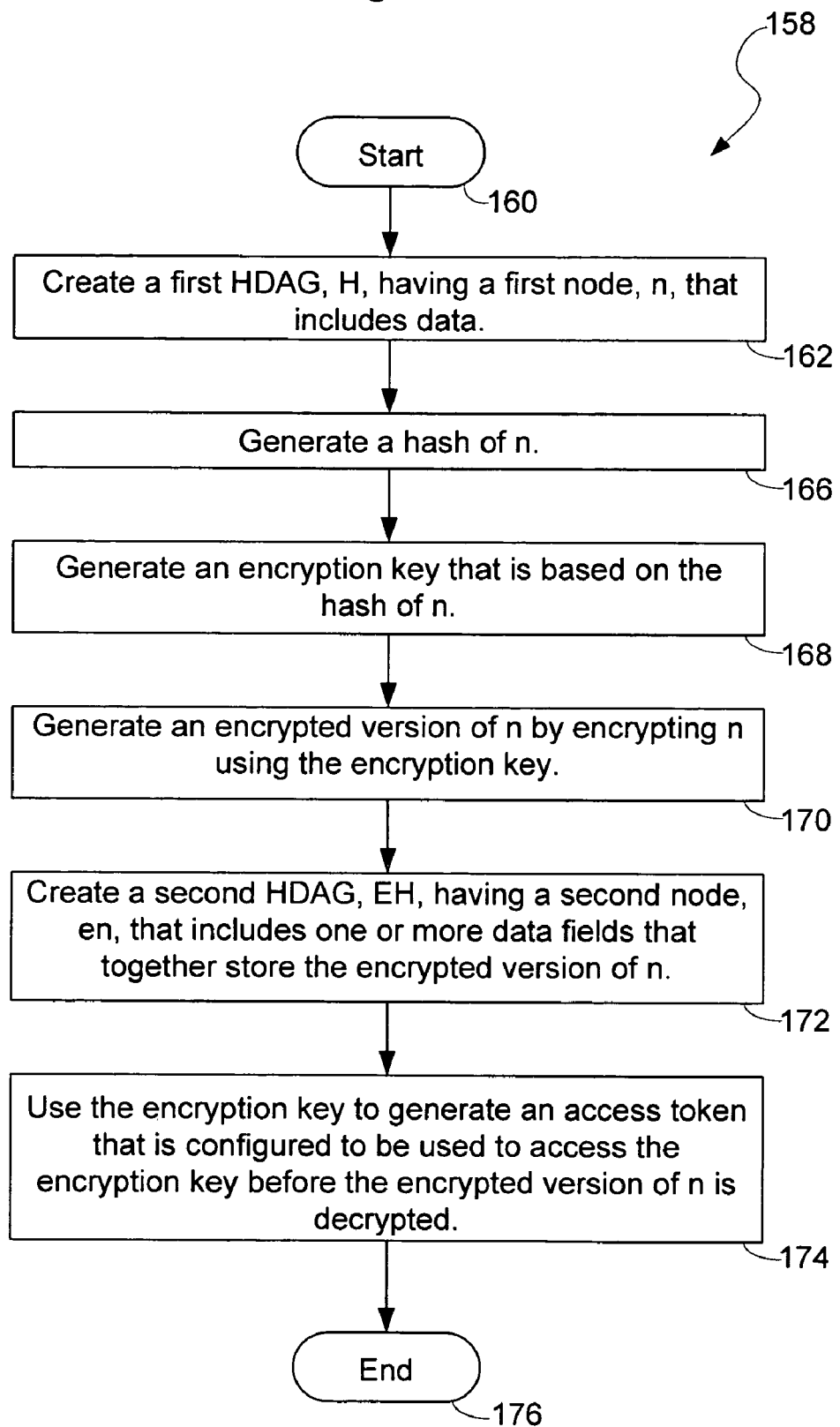
FIG. 10 is a flowchart that includes steps associated with a method of creating an embedding node according to one embodiment of the invention.

FIG. 10 is a flowchart 158 that illustrates the steps of a method that may be used to create an embedding node 122. Referring additionally to FIGS. 7 and 8, the method starts at step 160, followed by step 162, where a first HDAG 116, H, is created and H includes a first node 124, n, having data 164. Next, at step 166, a hash 134 of n is generated, and at step 168, an encryption key that is based on the hash of n is generated. At step 170, an encrypted version of n is generated by encrypting n using the encryption key. Next, at step 172, a second HDAG 118, EH, is created that has a second node 126, en, which includes one or more data fields 132 that together store the encrypted version of n. If n has child nodes 128, en has, as its child nodes 130, the embeddings of the child nodes of n, in a one-to-one correspondence. At step 174, the encryption key is used to generate an access token (discussed later in this document), which is configured to be used to access the encryption key before the encrypted version of n is decrypted. Finally, the method ends at step 176.

Referring again to FIGS. 1-3, 8, and 9, to provide a user 18 access to the original HDAG 116, H, given its embedding HDAG 118, EH, the user is provided with a pointer that includes the pair of hashes (h, k) 178 and 134, respectively. The user would then read the data structure that is represented by the HDAG EH, by using h to retrieve its root node 126 and k to decrypt the root node's payload, e.g., the contents of the root node's data field 132. In the case of leaf nodes 80, the payload is most commonly stored text or other literal stored data. In the case of non-leaf nodes 26, for each child i, $h_i$ (the pointer to child i) 180 is retrieved from the unencrypted section of the node and i.e., 182 is retrieved from the previously encrypted section of the node, i.e., the payload that is decrypted using k as the key, and the pair ($h_i$, $k_i$) is used to recursively retrieve and decrypt the $i^{th}$ child. Examples of non-leaf nodes are directory nodes and the indirection nodes that allow for the reconstruction of a whole file from its chunks, used in the chunked representation of files.

A chunked representation of a file is a file that is broken up into pieces, referred to as chunks. A file can be chunked, i.e., broken up into chunks, using any of a variety of methods. Three example methods for chunking a file include the following: (1) breaking the file up into fixed-size chunks; (2) sliding a window over the file and each time some predefined milestone is detected based on the content of the window, breaking up the file at that point; or (3) using the semantics of the file type to determine chunk boundaries. Once a file is chunked, it can be represented by an HDAG 10 where each chunk becomes a leaf node 80. To limit fanout, several levels of indirection nodes may be used to get from the HDAG's root node 30 to the file chunk leaf nodes. To accomplish this, a list of hash pointers to the leaf nodes is created. This list is then treated as a file as described above and broken up into chunks. Each of the resulting chunks is turned into an indirection node having no data field but having the children whose hash pointers that chunk contains. The hashes for these new indirection nodes are collected into a list, and the process continues recursively until a single indirection node remains. The hash pointer for that indirection node becomes the root hash for the HDAG for the contents of the entire file.

The advantages of the embodiments of FIGS. 7-9 are twofold. First, because the contents of the nodes 120 are encrypted, if the keys are not stored on a server 14, compromise of the server will not compromise the data stored on it. Note that because of the recursive procedure described previously, the users 18 of an HDAG 116 and 118 need only keep the root hash 134 and possibly 178, respectively, elsewhere even though each of the HDAG 116's nodes is encrypted using a different key.

Because data fields 132 of the HDAG nodes 122 are encrypted, if different organizations, even mutually competitive organizations, use one another's HDAG stores 14 for redundancy, they will learn very little about each other's data and/or data usage. More precisely, an organization can watch its rival's encrypted traffic to learn how much data they have, the structure of their HDAGs 116 and 118, e.g., how many children 28 each node has and how long its data field is, and how often they access various pieces of data 164. Because the scheme uses deterministic encryption, an organization can also guess at the contents of any of its rival's nodes. Thus, for example, an organization might be able to tell that a rival organization had 100 snapshots, each containing 100 ten megabyte files, yet the organization is unable to tell anything about the contents of those files unless it already has an exact piece of one of those files. Even in the later case, the organization will learn nothing about the pieces of the files that it does not already have.

If such an information leak is considered problematic, deterministic means can be used to reduce it. For example, to mask the size of an embedded node 120, an encrypted padded version of it can be embedded instead of a straightforward encrypted version of it. An encrypted padded version of a node may be produced by first deterministically padding the node then deterministically encrypting it. There are many ways of deterministically padding a node so that it occupies more space. In one embodiment, a padded version is constructed by concatenating the original node 120, the hash of the original node, and a pad consisting of a number of bytes given by the low-order l bits of the original node's hash. Each of the bytes is deterministically generated based on the hash, as by being a constant value, a sequential series of values, or successive steps in a pseudorandom sequence. To recover the original node, a hash is computed for each prefix of the padded version; the prefix whose hash is equal to the hash of the original node (k, which the accessor already knows) is the original node. In an alternative embodiment, the padded version is constructed by prepending the length of the unpadded node to the unpadded node, and a pad constructed as in the prior embodiment is appended to the end. In other embodiments, to hide the length of the original nodes, the data fields 132 of the embedding nodes 122 can be padded to either a fixed length or a rounded up length before they are encrypted. For example, one way of padding is to add to the original node enough zero bytes to reach a desired length.

Referring again to FIG. 1, similarly, extra child nodes 28 can be created by using the hash of the parent node as an algorithmic seed. This can be done by computing a number of added children based on the hash of the to-be-embedded node. Within the version of the to-be-embedded node, child pointers that are identified as padding (e.g., null pointers) can be added at any position. At corresponding positions in the embedding node's unencrypted child list, pointers to fake children/sub-HDAGs as well as the pointed-to fake nodes/HDAGs can be constructed using a pseudorandom sequence seeded by the hash of the original to-be-embedded node.

Such extensions will add complexity and degrade performance, but they might be warranted in some situations. By suitable marking of the HDAG nodes 122 or the versions of nodes 120, in either the encrypted or unencrypted portions, such padding nodes can be intermixed with normal unpadded nodes in the same store 12, or even in the same HDAG 118.

Because the data field 132 of each node 122 is encrypted with a hash that is computed deterministically based on the contents of the node 120 that node embeds, sharing of embedding nodes will take place even though the separate writers 18 of the nodes may be unaware of one another's existence and likely will not be able to read one another's files. These two properties, taken together, mean that multiple, mutually untrusting people and organizations can safely store their information in the same store 12 even if they do not trust that the store will not be compromised. In this scheme, the store will gain the benefits of sharing storage space between different users, even for the users' sensitive documents.

Figure 11:
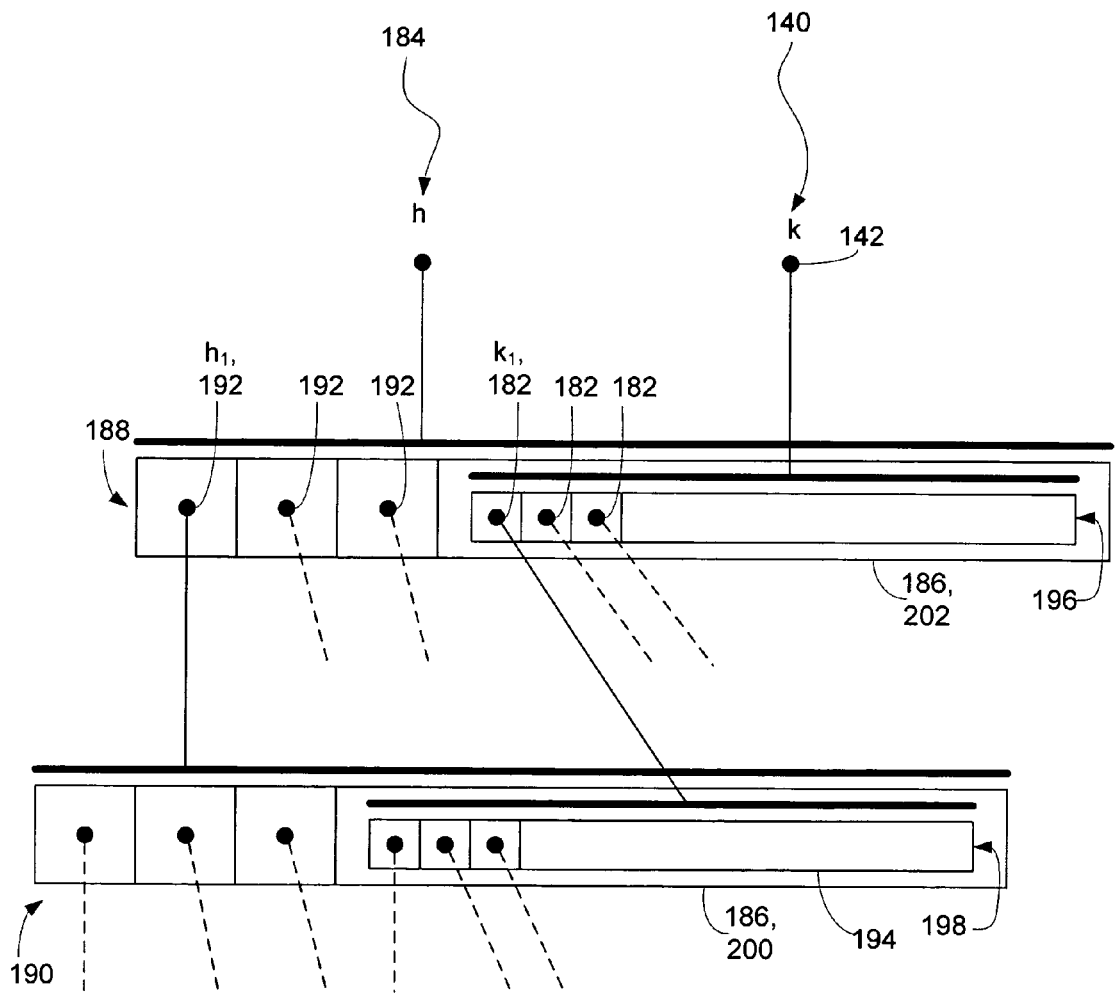
FIG. 11 is an example HDAG that illustrates the embedding of unencrypted versions of parent and child nodes within respective parent and child embedding nodes according to one embodiment of the invention.

Clear Embedding Nodes:

Of course, the security that results from the above-described embedding scheme does come at a cost. The embedding nodes 122 are larger, since they need to store two hashes 180 and 182 for each child node 28 rather than one hash. Also, the encryption and decryption of the data fields 132 takes time. In many cases, the contents of a node's data field may be considered to be sufficiently non-sensitive that the information can be stored unencrypted. This can be done by embedding non-encrypted versions of the embedded nodes; the resulting embedding nodes are called "clear embedding nodes." FIG. 11 shows the result of embedding the HDAG 140 from FIG. 9 using clear embedding nodes, which yields the embedding HDAG 184. Note that the data fields 186 of the embedding nodes 188 and 190 are not encrypted. The resulting embedding nodes still have two hashes 192 and 182 per child node 190, but no longer require that their data fields be decrypted before the corresponding embedded node can be obtained. Thus, $h_i$ 192 and $k_i$ 182 can be stored in an unencrypted manner in the clear embedding nodes. Whether or not an embedding node's data field needs to be decrypted can be determined by checking if the hash 192 and 180 of the data field's content is equal to $k_i$; if not, the data field needs to be decrypted. Note that each $k_i$ has the same value in FIGS. 9 and 11 while the $h_i$s differ.

Note that the clear embeddings 188 and 190 and non-clear embeddings 148 and 150, i.e., embeddings where the data field 156 is encrypted, of a given node are different, and therefore not shared. In one embodiment, when one clear embedding node 188 has another clear embedding node 190 as its $i^{th}$ child, $k_i$ 182 can be determined from that node because it can be computed from that child's data field 194, since it is the hash of that field. Thus, the $k_i$ children pointers 182 of nodes like node 196 to nodes embedded in clear embedding nodes (e.g., 190) can be abbreviated or only inferred in the versions of those nodes 196 used for embedding to save space if desired.

Clear and non-clear embedding nodes can be mixed. For example, the clear embedding node 190 of FIG. 11 could have been a non-clear embedding node 154 instead. The only difference this would have made would be for data field 200 of node 190 to be encrypted. Alternatively, if we had made node 188 a non-clear embedding node instead, data field 202 would have been encrypted instead.

Figure 12:
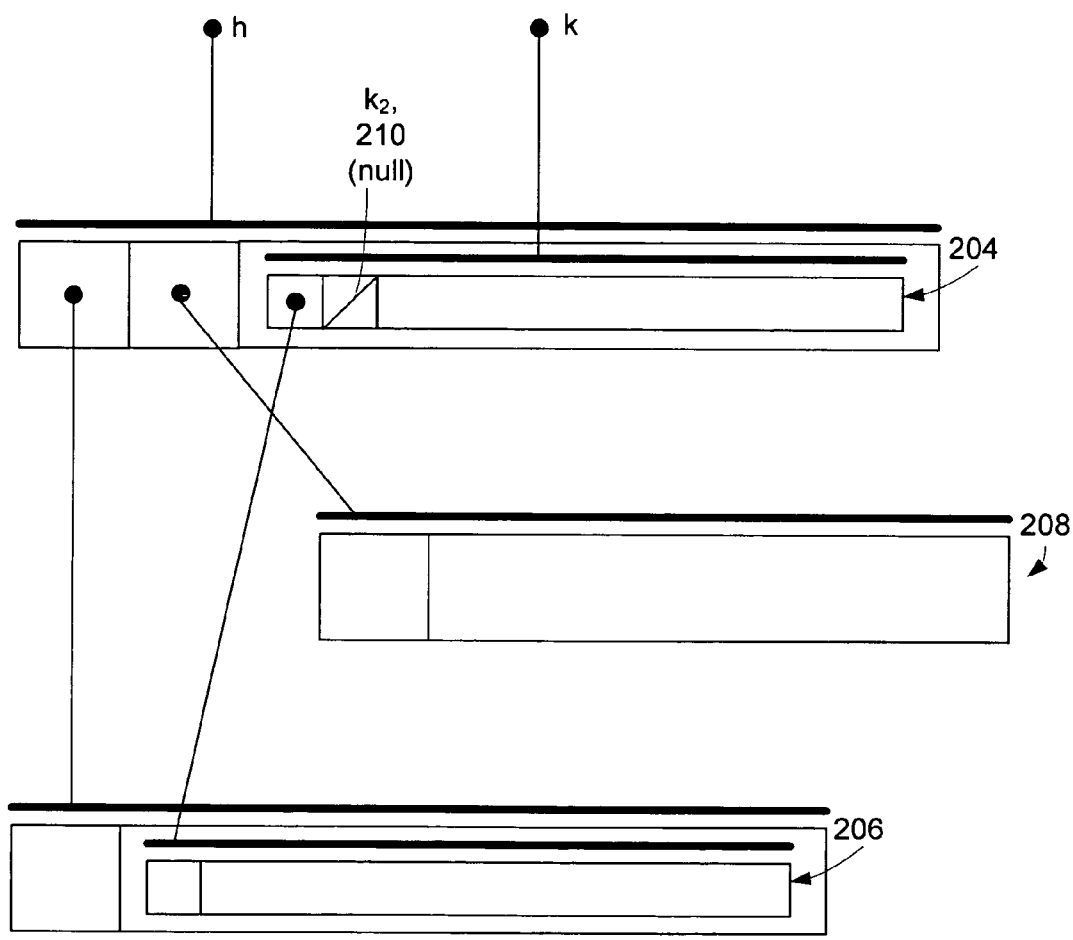
FIG. 12 is an example HDAG that illustrates an unencrypted embedding parent node, an unencrypted embedding child node, and a non-embedding child node according to one embodiment of the invention.

Referring again to FIGS. 7-9, if all or most of an entire sub-HDAG of the original HDAG 116 does not need to be encrypted, then it is more efficient to leave that sub-HDAG as it is, and to just point to it from the embedding HDAG 118. That is, when the original HDAG is transformed, the nodes of the sub-HDAG are mapped to themselves rather than to embedding nodes. The other nodes are transformed as usual except that pointers 180, 182, and 192 to nodes in the sub-HDAG use ($k_i$, $k_i$) or ($k_i$, null) rather than ($h_i$, $k_i$). As before, the use of null (or any other distinguished value) here is a space saving device. See, for example, FIG. 12 where nodes 204 and 206 have been embedded using clear embeddings, but node 208 has not been embedded. The slash 210 denotes a null pointer. Alternatively, a distinguished value can be used for $k_i$ to signal that the child is not an embedding node. In other embodiments, when one embedding node has a clear embedding node 190 as its $i^{th}$ child, $k_i$ can be determined from that node's data field 200 because it can be obtained from the $i^{th}$ child pointer of that node. The same trick can be used to leave multiple sub-HDAGs unencrypted. In still further embodiments, the child node itself may be marked to show whether it is a non-embedding, clear embedding, or non-clear embedding node.

Independently Encrypted Embedding Nodes:

A drawback to the encryption scheme outlined above is that by obtaining a full pointer, i.e., both the h key 178 and the k key 134, to the root 126 of an embedding HDAG 118, a user 18 obtains the ability to decrypt all of its contents. While this is desirable nearly all of the time in the case of single files and often will be desirable in the case of directory trees, there will be many situations in which access in the original, unencrypted HDAG 116 should be provided just down to a point, below which a different access control policy may apply.

For example, consider an HDAG 10 representing the filesystem of a client computer 20 or other computer. Read access to most of the files can be given to pretty much anybody 18 in an organization, while preventing competitors from seeing the files. For a subdirectory related to a specific project, access should be restricted to members of a specific project team. Also, within that specific subdirectory there are specific files, e.g., performance reviews, which should be able to be read by just one person in the organization. In addition, the home directories of the several users of the machine should just be readable only by them and perhaps those with administrator privileges.

One example of how to address the above-described issue is to count on the store 16 to keep track of who 18 is allowed to retrieve which nodes 24 and the metadata 58 associated with the nodes. The downside of relying on the store to keep track of access rights is that the store might become compromised, and then not only would the data be exposed, but so would the name of the individuals that had access to the data. Such metadata also is problematic when it comes to federating the data, i.e., subdividing the storage of the data, across multiple stores, as it is subject to change and should be merged when nodes are retrieved from the multiple remote sites. Indeed, with a federated store, the stores themselves may not be secure.

Figure 13:
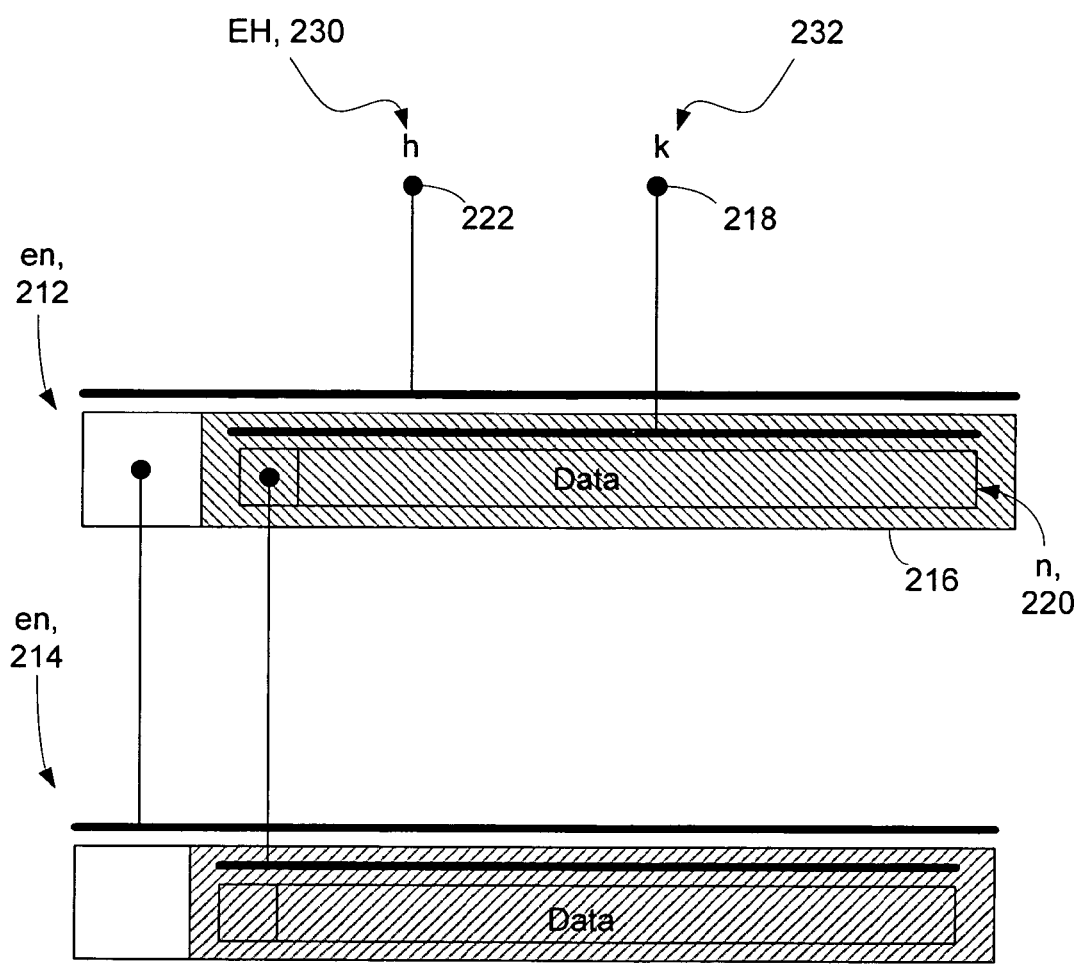
FIG. 13 is an example HDAG that illustrates independently encrypted embedding nodes according to one embodiment of the invention.

Referring to FIG. 13, one approach for addressing this issue is to introduce a new type of node 24, an independently encrypted embedding node 212. Node 214 of FIG. 13 by contrast is a normal non-clear embedding node 122. An independently encrypted embedding node has an encrypted data field 216 as before, but the encryption is handled differently (note that the shading of data field 216 is reversed from that of the previous encrypted fields). For a normal, non-clear embedding node 126, the encryption key is the hash 134 of the original embedded node 124 using the regular hash function that is applied throughout the HDAG 116.

In one embodiment for an independently encrypted embedding node 212, a different hash function, which is well known to all the users 18 of the system, is used for generating the encryption key. Assume that the original hash function is called "$hf_{orig}$," and the hash function that is used for generating the keys of independently encrypted nodes is called "$hf_{ind}$." In this example, without knowing the data that is hashed ("d"), knowing $hf_{orig}(d)$ does not help guess $hf_{ind}(d)$. In this embodiment, the procedure for creating an independently encrypted embedding is the same as the procedure for creating regular, non-clear embeddings 126, except that the hash function $hf_{ind}$ is used for generating the encryption key rather than $hf_{orig}$, and, under some circumstances, there may be some additional, possibly unencrypted, fields that may be used by authorized parties to retrieve $hf_{ind}(d)$. So, to clarify matters, for independently encrypted embedding nodes, there can be the following three hashes: k 218, the hash of the original node 220 using the hash function $hf_{orig}$; k', the hash of the original node using the hash function $hf_{ind}$; and h 222, the hash of the embedding node 212 using the hash function $hf_{orig}$. k' is used as the key for encrypting the original node. In other embodiments, different functions are used to determine the encryption key for independently encrypted embedding nodes from the to-be-embedded node. Under one embodiment, a random number is used as the encryption key.

Consider trying to access original node 220 ("n"): the parent embedding node of independently encrypted embedding node 212, which embeds node n 220, when accessed by an authorized party (for example, in the case of a normal non-clear embedding node, a party that knows both h and k for the parent embedding node) provides h 222 and k 218 for embedding node 212 ("en"). But, unlike with ordinary embedding nodes, these pointers cannot be used for decrypting the child en's data field. This means that while the user can obtain en using h 222, to decrypt its data field the user needs to obtain k' through a separate mechanism. Some possible mechanisms are described below. However, once k' is obtained, the user can use k 218 to ensure the integrity of the parent-child relationship.

In the schemes described below, a user 18 with the right credentials will be able to retrieve an access token ("v") for the independently encrypted node 212. The access token v might simply be k', in which case the independently encrypted embedding node's data field 216 can be decrypted. To provide further security, v can equal k XOR k'. In that case, to decrypt the embedding node's data field, the user has to have access to k 218, since by virtue of the fact that k XOR k' XOR k equals k', the decryption key, i.e., k', can be obtained by XORing v and k. In practice, this would come about by the user having access to the unencrypted original parent node 220, since that node includes k.

In other schemes, $hf_{ind}$ can be a non-deterministic function that ignores its input, e.g., it may just return a random number. However, this somewhat reduces sharing. In addition, v can be computed from k 218 and k' in any way that allows k' to be retrieved from v and k (see previous discussion regarding k' being obtained by XORing v and k).

Figure 14:
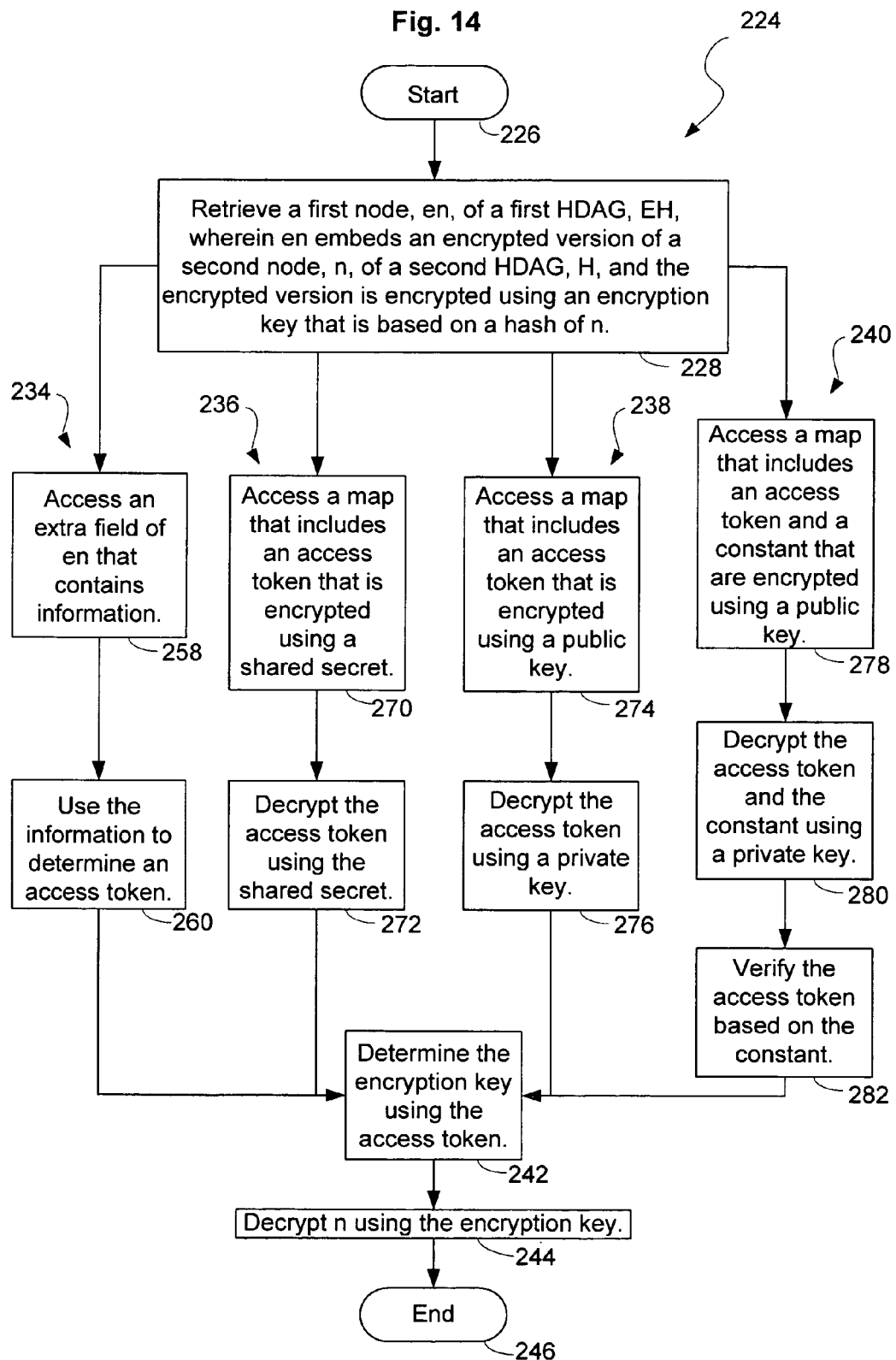
FIG. 14 is a flowchart that includes steps associated with methods for retrieving an independently encrypted embedding node and decrypting the node embedded in it according to one embodiment of the invention.

FIG. 14 is a flowchart 224 that illustrates the steps of a method for retrieving an independently encrypted embedding node 212 and decrypting the embedded node 220. The method starts at step 226, followed by step 228, where a first node en 212 of a first HDAG 230, EH, is retrieved from a computer-readable medium 12. The first node en 212 embeds an encrypted version of a second node 220, n, of a second HDAG 232, H. The encrypted version of node n is encrypted based on a hash of n. The next steps involve obtaining an access token. Four example approaches 234-240 for doing this are shown in FIG. 14, and discussed in greater detail below. One approach 234 is based on an extra field, another approach 236 is based on shared secrets, and the other two approaches 238 and 240 are based on public-key encryption. Next, at step 242, the encryption key is determined using the access token. Next, at step 244, n is decrypted using the encryption key. All of the approaches end at step 246.

Figure 15:
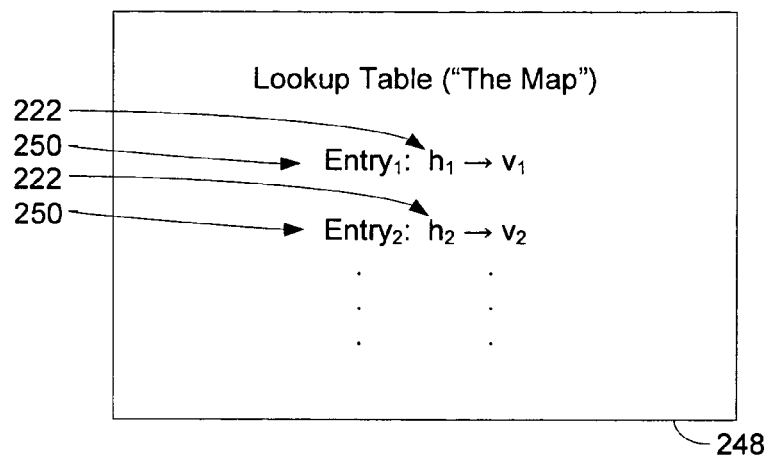
FIG. 15 is an example lookup table.

Referring additionally to FIG. 15, all but the first approach 234 assume the existence of a lookup table 248 that is indexed by the value of h 222. This table is called "the map." Entries in the map are name-value pairs 250, where the associated value can be obtained by providing the name. An entity, the grantor, by adding entries to the map, grants an entity, the grantee, the ability to decrypt the data field 216 of a specific independently encrypted embedding node 212. In some embodiments, if an entity attempts to add a second entry with the same name, the attempt fails. In other embodiments, if multiple entries with the same name are added to the map, a request to retrieve the values associated with a name retrieves the values from all such entries. In some further embodiments, entries can be removed from the map according to a retention policy. In some embodiments, multiple federated servers 14 each have their own maps and it is possible to retrieve a set containing the values associated with a particular name in all or some subset of these maps. Note that in the following, stating that an entry comprises a certain value does not preclude that value comprising other information, including without limitation, the time the entry was added, the entity requesting the addition, or a prior value.

Figure 16:
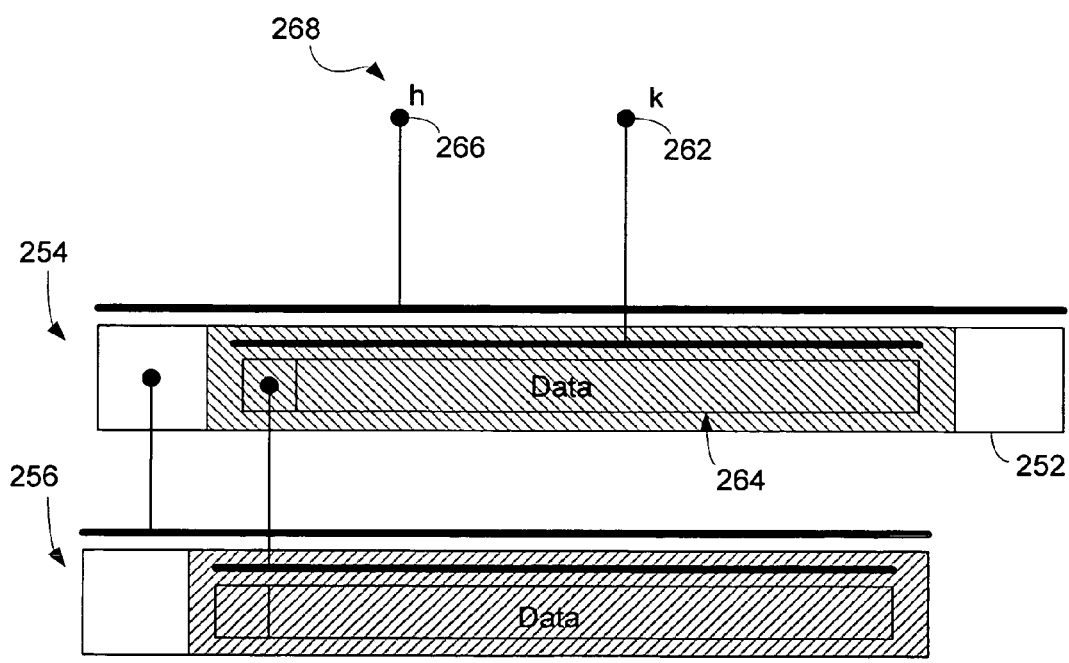
FIG. 16 is an example HDAG that illustrates an independently encrypted embedding node having an extra field according to one embodiment of the invention.

First Approach—Using an Extra Field:

Referring additionally to FIG. 16, in the first approach 234, an extra field 252 is added to every independently encrypted embedding node 254. As with the analogous node of FIG. 13, node 256 of FIG. 16 is a normal non-clear embedding node. At step 258, the extra field 252 is accessed and its information retrieved. The extra field holds a list, each element of which contains information, which a single authorized user 18 (or group of authorized users considered equivalent) can use to obtain v, the access token, which is used to determine the encryption key (see step 242). In one embodiment, the elements are pairs of values, each pair containing some value (e.g., name, user number, or public key) indicative of the identity of the person (or other entity) being granted access and a copy of v encrypted according to an encryption key that corresponds to a decryption key possessed by the authorized entity. At step 260, the information of the extra field is used to determine the access token v. To obtain v, an entity searches the list for an identity for which it knows the associated decryption key. It then uses this key to decrypt the corresponding encryption of v to obtain v, which it uses to obtain k' in step 242. More than one such identity may apply to a given entity, as when access is granted to an individual and a role (e.g., "board member") that the individual fills. If no such known identity is found, the entity is not a grantee.

In another approach, each element of the list in the extra field 252 comprises a copy of v, along with a well-known constant, encrypted according to an encryption key that is associated with one grantee. To obtain v, an entity 18 uses its decryption key to decrypt each element until one is found whose decryption consists of a number followed by the well-known constant. This number is taken to be v and is used to obtain k', which is used to decrypt the encrypted version of the embedded node. If no such v is found, the entity is not a grantee.

In an alternative approach, each element in the list consists solely of a copy of v, encrypted by a grantee's encryption key.

In this approach, each element is decrypted to obtain a potential v, which are used in turn to obtain encryption keys $k_i$, each of which may or may not be k'. Then, the encrypted version of the embedded node is decrypted once using each key, $k_i$, and the result are hashed using $hf_{orig}$. If a resulting hash is k 262, then the corresponding $k_i$ was k', and the corresponding decryption is the original embedded node. If no such decryption key results in a decryption that hashes to k, the entity 18 is not a grantee.

Symmetric or asymmetric encryption can be used for computing the copies of v. In symmetric encryption, both encryption and decryption make use of the same key, which must therefore be known to (and kept secret by) both the entity 18 encrypting and the entity decrypting. In asymmetric encryption, two complementary keys are used, one of which (the "private key") is known only to the one who is to decrypt, and the other of which (the "public key") may be openly revealed to any entity that wishes to encrypt a message in such a way that only an entity that knows the private key can decrypt it.

The main disadvantages that are associated with approach 234 are the following: the embedding nodes 254 will be larger, since extra information is included; and every time access is changed to an original node 264, its embedding node's (254's) hash 266 changes, and this change is propagated up the spine of the embedding HDAG 268. This will reduce sharing, even between temporal versions in the same filesystem, and especially between different filesystems, as different users 18 will likely be granted access to different filesystems. Also, in the approach in which the field 252 contains grantee identities, information about which entities are granted access is available to any entity that has access to the independently encrypted embedding node. Furthermore, extra work must be done to identify the correct entry in the field or to determine that no such entry exists.

In other approaches, some or all of the encryptions of v can be stored in an extra field in the parent embedding node(s) (not shown) of the independently encrypted embedding node 212. This can be used to make access dependent on how the independently encrypted embedding node was reached.

Second Approach—Using a Shared Secret:

Referring again to FIGS. 13-15, in the second approach 236, it is assumed that there is a deterministic private-key encryption scheme that, given a secret "s," which is known just by the grantor and the grantee, encrypts and decrypts strings. To use this scheme, the grantor and grantee agree on s. Then, the grantor encrypts both h 222 and v resulting in the pair $<E_s(h), E_s(v)>$. Next, the grantor adds an entry in the map 248 for this pair, and the store computer 14 makes the map available. When the grantee wants to retrieve the access key, the grantee computes $E_s(h)$, accesses the map, and looks up any entries with name $E_s(h)$ in the map (see step 270). If there is an entry, the grantee will retrieve $E_s(v)$, which the grantee then decrypts using s to recover the access key v (see step 272), which is used to determine the encryption key (see step 242).

Note that at no point does the grantor need to communicate to the grantee that access is being granted. Also, because h 222 is encrypted by s, each grant of access will generate a different entry 250 in the map 248, and because s is not guessable, knowing h is not sufficient to discover who has access.

Third Approach—Using a Public-Key Approach:

The third approach 238 is similar to the second approach 236, except that public-key cryptography is used. In this approach, rather than a shared secret, it is assumed that there is some notion of a public identity or credential that is known to the grantor and the grantee, and perhaps others, and that there is a public key ("pub") and private key ("priv") associated with this identity. The grantor computes a hash of h 222 along with the public key using a hash function $hf_{grant}$, which may be the same as $hf_{orig}$, resulting in $hf_{grant}$(h;pub)). The grantor also encrypts v using the public key, pub, resulting in $E_{pub}(v)$. The grantor adds the pair $<hf_{grant}$, (h;pub), $E_{pub}(v)>$ to the map 248, which is accessed by the grantee (see step 274). To retrieve the access key, the grantee computes $hf_{grant}$ (h;pub), looks up the table under this name, and if it finds an entry with a corresponding $E_{pub}(v)$, the grantee decrypts $E_{pub}$ (v) using the private key, priv, to obtain v (see step 276). Finally, the grantee determines the encryption key using v (see step 240).

Using this approach 238 has all of the advantages of public-key cryptography, e.g., there is no need to distribute or store shared secrets, so the same public key can be used by all grantors at all times. This reduces the number of required keys, and makes it possible for the keys to more meaningfully represent entities, groups entities belong to, and roles entities may have, each of which can be considered a grantee.

In another example, pub in $hf_{grant}$(h;pub) can be replaced by a name or other identifier for the grantee. Also, other methods of combining h 222 and pub also can be used to generate the entry name.

Fourth Approach—Using Public-Key Encryption with Hidden Access Information:

In this fourth approach 240, as was the case in the previous approach 238, it is assumed that there is some notion of a public identity or credential id that is known to the grantor and the grantee, and perhaps others, and that there is a public key ("pub") and a private key ("priv") associated with this identity. In this approach, the entries 250 in the map 248 are of the form $<hf_{grant}$(h), S>, where S is a set of strings. To grant access to an individual 18 using the public key pub, the grantor generates $E_{pub}(c;v;r)$, and adds it to the set of strings that are associated with $hf_{grant}$(h), where r is a random number and c is a constant, which is fixed for all time, and the store computer 14 provides access to the map to the grantee.

To obtain v, the grantee accesses the map 248, obtains the set associated with $hf_{grant}$(h) (see step 278), and decrypts each one of the entries in the set with the grantee's private key priv (see step 280). If one of the decrypted strings starts with c, then the grantee knows that the string is meant to be accessed by the grantee (see step 282). Then, the grantee can extract v from the decrypted string. Finally, the grantee determines the encryption key using v (see step 242).

The advantage of this approach 240 over the third approach 238 is that a third party who knows h 222 and v, but does not know priv will not be able to determine that the individual 18 with identity id has been granted access to v. The disadvantage is that the individual's computer 20 that has priv has to retrieve and possibly decrypt all the entries 250 associated with $hf_{grant}$(h). In a federated architecture, this means that the store 14 cannot filter out the entries that are irrelevant to the grantee, potentially increasing the bandwidth and computation requirements.

Figure 17:
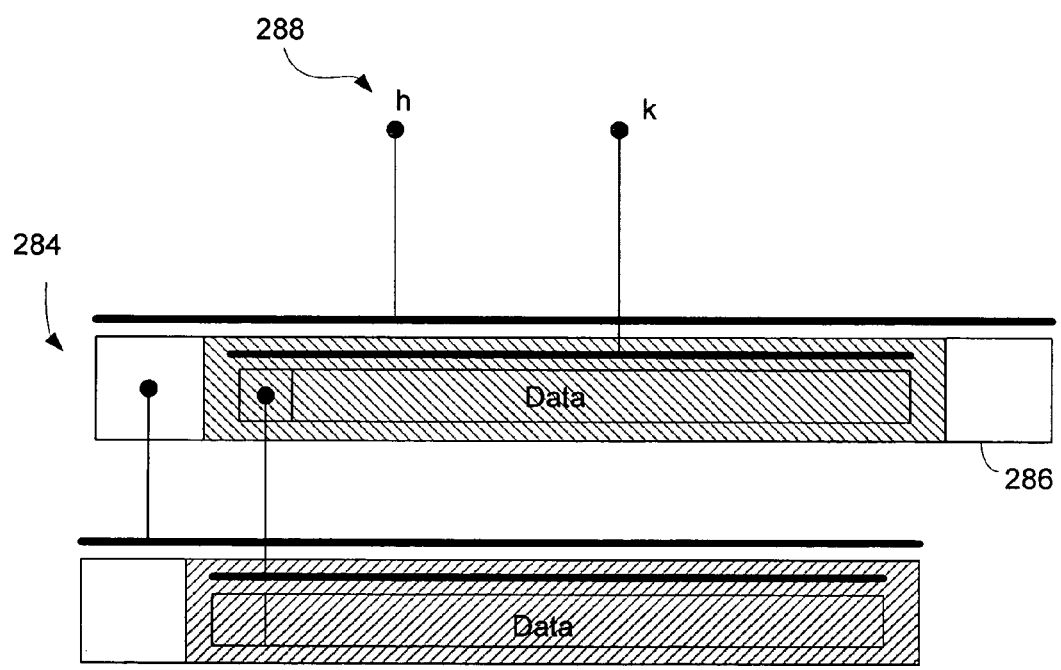
FIG. 17 is an example HDAG that illustrates an independently encrypted embedding node having an extra field according to one embodiment of the invention.

Method of Obtaining V:

Referring additionally to FIG. 17, because v can be computed in a variety of ways, as documented above, every independently encrypted embedding node 284 can include a field 286, which indicates the method by which v was computed from k' and possibly k or, equivalently, the method by which k' may be computed from v and, optionally, k. Even within a single HDAG 288, the method for how v was computed for each independently encrypted embedding node can vary.

Thus, between the various independently encrypted embedding nodes that are included in the HDAG, the field that notes how v was computed for that node can be different for each node. Alternatively, the individual v values may contain an indication of the relationship between v (and, optionally, k) and k'. For example, a specific bit in v can indicate, based on its value, whether the remaining bits comprise k' directly or k' combined in a reversible manner with k. In embodiments in which different values of v are associated with different grantees, the method by which v was computed may differ for different grants of access. Such an indication may be internal or external to any encryption or hash including v.

Figure 18:
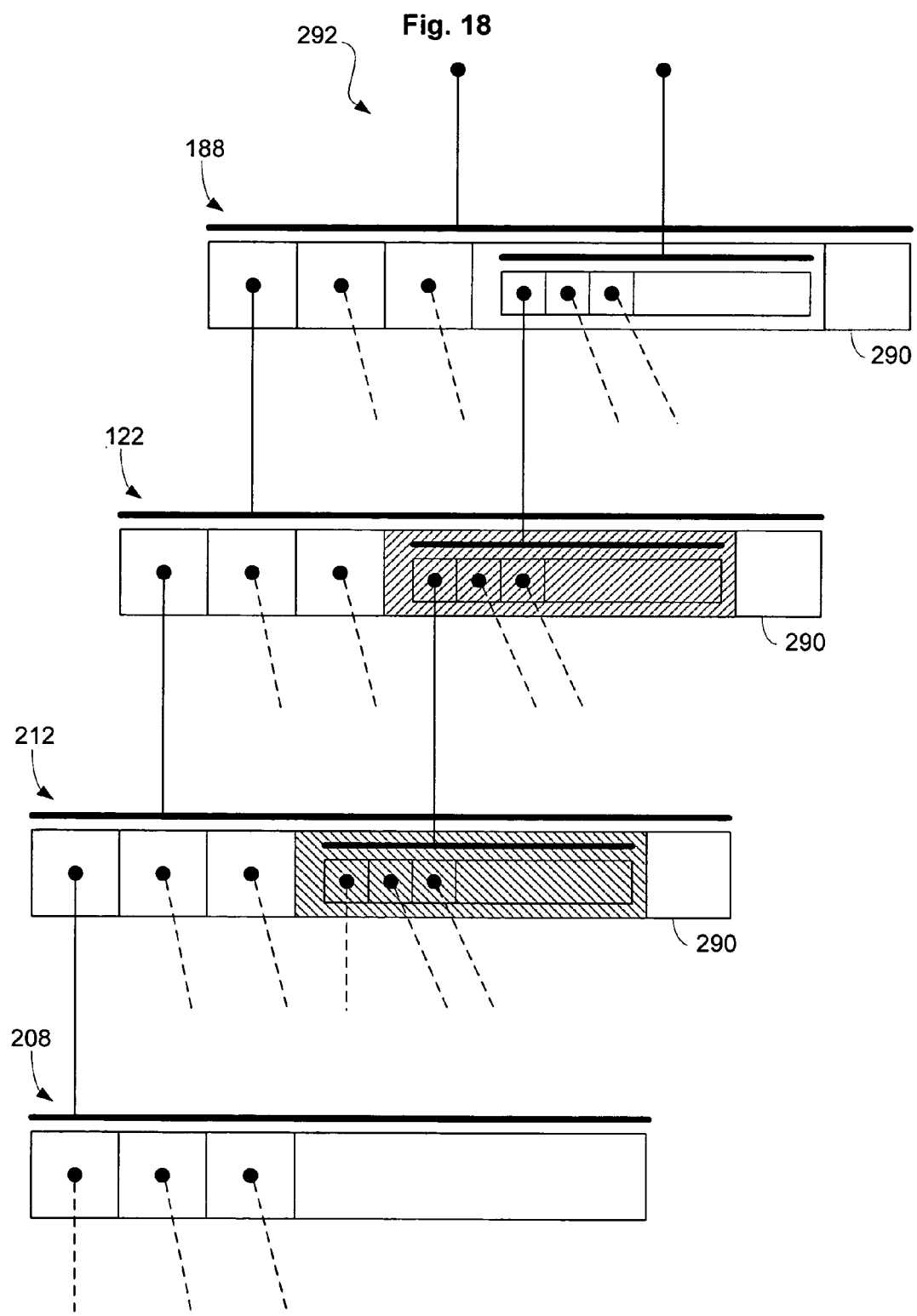
FIG. 18 is an example HDAG according to one embodiment of the invention that includes four types of nodes, wherein each embedding node has a node-type field.

Node Type:

Referring again to FIGS. 1, 8, 11, and 13, so far, the following four types of nodes 24 have been discussed: original (non-embedding) nodes 208, clear embedding nodes 188, non-clear embedding nodes 122, and independently encrypted embedding nodes 212. The latter two node types may optionally used padding. Referring to FIG. 18, to facilitate a determination of which type of node that is being dealt with, every embedding node can include a field 290 where the node type is indicated. It should be noted that all four types of nodes 122, 188, 208 and 212 can coexist in the same HDAG 292. In contrast, specific implementations may restrict the HDAG to use less than all of the four types of nodes.

In embodiments, there can be a mixture of all three embedding types within an HDAG 10. It is expected that typically, the topmost nodes of a system's embedding HDAG 118 may be clear embedding nodes 188, representing well-known shared structure. Within the HDAG, there can be sub-HDAGs of mostly non-clear embedding nodes 122 rooted by independently encrypted embedding nodes 212. Within the sub-HDAGs there can be other such sub-HDAGs. When representing a filesystem, a first approach is for each file or directory to be represented by an HDAG rooted at an independently encrypted embedding node, with the further nodes comprising a single file or directory (down to subdirectories or files) being non-clear embedding nodes. A second approach is to have independently encrypted embedding nodes when there is an explicit decision to change access policy. The first approach is more flexible in terms of being able to change access policy without requiring a change to the structure, and therefore the creation of new nodes, but it requires more key lookups.

Authorization Brokers:

Referring again to FIG. 2, to allow for a more flexible notion of role-based or otherwise changeable identity, a system 16 can be designed so that the actual keeper of some or all of the private keys is not necessarily the user 18, but may be an authorization broker 294, which is coupled to the computer 14, or included in the computer 14. With the public-key approach, the user knows all of the public keys for the identities they have, or believe they have, including all current group memberships and roles. Examples of memberships or roles include status as members of a department or team or as a manager or administrator. Examples of roles are statuses that come and go over time, such as being "on duty," "at the office," or "in command." The user can gain access to or lose these memberships or roles over time. The user may, in some embodiments, obtain the list of their identities, memberships, and roles from one or more authorization brokers. When it is time to decrypt an $E_{pub}(v)$, the users delegate that task to the appropriate authorization broker, i.e., the broker who knew the corresponding priv, who would perform the decryption if convinced that the user actually belonged to that identity at that point in time.

The obvious drawback of authorization brokers 294 is that, if an authorization broker is compromised, it can reveal v to unauthorized users 18, since the broker has access to the decryption key for $E_{pub}(v)$. If v equals k', this means that an intruder can decrypt the independently encrypted embedding node 212. If v equals k XOR k', the intruder needs k as well as v to determine the decryption key.

By using authorization brokers 294, revocation of permission is possible. For example, the authorization broker could maintain a blacklist of (identity, $E_{pub}(v)$) pairs. The authorization broker would refuse to decrypt $E_{pub}(v)$ for a person 18 with identity, I, if the pair (I, $E_{pub}(v)$) is on the blacklist. This would allow an authorized user to revoke access for I to node en 212's embedded node by putting the pair (I, $E_{pub}(v)$) on the blacklist where v is the access token that I needs to decrypt that embedding node's data field 216. Access could be reinstated later by removing that pair.

Advantageously, the embedding proposed in this document allows insecure systems to take advantage of the HDAG properties for structure sharing, synchronization, and completeness checking without allowing those users 18 who have access to the system to have access to all of the contents of the system's data. Also, the HDAGs 10 that are included in the embodiments of the invention provide a flexible and adaptable representation of a data structure that is accessible by multiple users, with each of the users having different access limitations.

The foregoing detailed description of the embodiments of the invention is provided for purposes of illustration, and it is not intended to be exhaustive or to limit the invention to the particular embodiments disclosed. The embodiments can provide different capabilities and benefits, depending on the configuration used to implement the features of the invention. Accordingly, the scope of the invention is defined by the following claims.

What is claimed is:

1. A method for creating an embedding hash-based directed acyclic graph ("HDAG"), the method comprising:
   a. creating a first HDAG having a plurality of nodes including a first node that includes data; and
   b. creating, by a computer, a second HDAG having a plurality of nodes including a second node that includes one or more data fields that store an encrypted version of the entire first node generated by using an encryption key that is based on a hash of the first node.

2. The method according to claim 1, wherein the step of creating the second HDAG includes:
   a. generating the hash of the first node;
   b. generating the encryption key that is based on the hash;
   c. generating the encrypted version of the first node by encrypting the first node using the encryption key;
   d. creating the second node that has one or more data fields; and
   e. storing the encrypted version of the first node in the one or more data fields.

3. The method according to claim 2, further comprising using the encryption key to generate an access token that is configured to be used to access the encryption key.

4. The method according to claim 1, wherein the one or more data fields contain an encrypted padded version of the first node.

5. The method according to claim 1, wherein the first HDAG further comprises a first extra child node which is a child of the first node and the second HDAG further comprises a second extra child node which is a child of the second node, and wherein the second extra child node includes one or more data fields that store an encrypted version of the first extra child node generated by using an encryption key that is based on a hash of the first extra child node.

6. The method according to claim 1, wherein the first node is configured to represent an item selected from the group consisting of a directory, a subdirectory, a file, a communication, a document, a record, a collection, a portion of a directory, a portion of a subdirectory, a portion of a file, a portion of a communication, a portion of a document, a portion of a record, and a portion of a collection.

7. A method for retrieving an embedded node from a computer-readable medium and decrypting the embedded node, the method comprising:
 a. retrieving a first hash-based directed acyclic graph ("HDAG") from the computer-readable medium, wherein:
  i. the first HDAG includes a first node having at least one data field that stores an encrypted version of a second node of a second HDAG, and
  ii. the encrypted version of the second node was generated from the second node using an encryption key that was based on a hash of the second node; and
 b. decrypting, by a computer, the encrypted version of the second node using the encryption key.

8. The method according to claim 7, wherein the first node has an extra field that contains information that is used to determine an access token, and further comprising determining the encryption key using the access token.

9. The method according to claim 7, further comprising:
 a. obtaining an access token that is encrypted using a shared secret;
 b. decrypting the access token using the shared secret; and
 c. determining the encryption key using the decrypted access token.

10. The method according to claim 7, further comprising:
 a. obtaining an access token that is encrypted using a public key;
 b. decrypting the access token using a private key; and
 c. determining the encryption key using the decrypted access token.

11. The method according to claim 7, further comprising:
 a. obtaining an access token and a constant that are encrypted using a public key;
 b. decrypting the access token and the constant using a private key;
 c. verifying the access token based on the constant; and
 d. determining the encryption key using the access token.

12. A system comprising:
 a. a computer that is configured to store a data structure in a non-transitory computer-readable medium and to retrieve a data structure from the computer-readable medium;
 b. wherein the data structure comprises:
  i. a first hash-based directed acyclic graph ("HDAG") including a plurality of nodes including a first node, and
  ii. a second HDAG including a plurality of nodes including a second node having at least one data field,
  iii. wherein the at least one data field stores an encrypted version of the entire first node generated by using an encryption key that is based on a hash of the first node.

13. The system according to claim 12, wherein:
 a. the hash is generated for the first node,
 b. the encryption key is generated based on the hash, and
 c. the first node is encrypted to form the encrypted version of the first node using the encryption key.

14. The system according to claim 13, wherein the encryption key is used to generate an access token that is configured to be used to access the encryption key.

15. The system according to claim 12, further comprising an authorization broker that is coupled to the computer and configured to determine if a user of the data structure should gain access to data included in the data structure.

16. The system according to claim 12, wherein the second node is selected from the group consisting of a clear embedding node, a non-clear embedding node, and an independently encrypted embedding node.

17. The system according to claim 12, wherein the second node contains a type field that is configured to include information that indicates a node type for that node.

18. The system according to claim 12, wherein the second HDAG further comprises a child node, wherein the child node is a non-embedding node.

19. The system according to claim 12, wherein the data structure is configured to be used by an application selected from the group consisting of an on-line data storage application, an archival data storage application, and a synchronization application.

20. The system according to claim 12, wherein:
 a. the first HDAG includes a third node which is a child of the first node;
 b. the second HDAG includes a fourth node which is a child of the second node, the fourth node having at least one data field; and
 c. the at least one data field of the fourth node stores an encryption version of the third node generated by using an encryption key that is based on a hash of the third node.

* * * * *